May 19, 1942.  R. SIAS  2,283,512
FLOTATION FRUIT SEPARATOR
Filed April 4, 1941  2 Sheets-Sheet 1
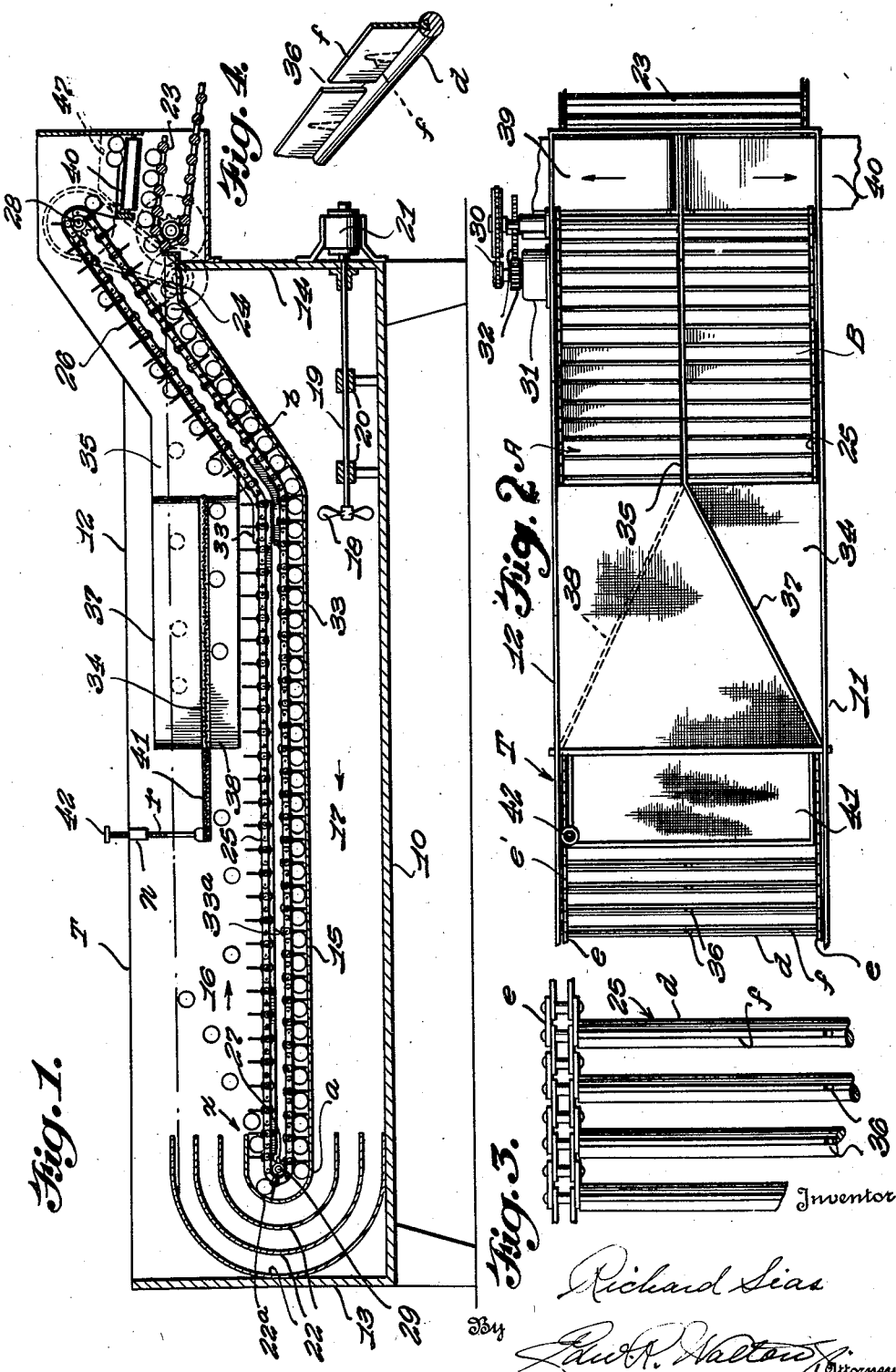

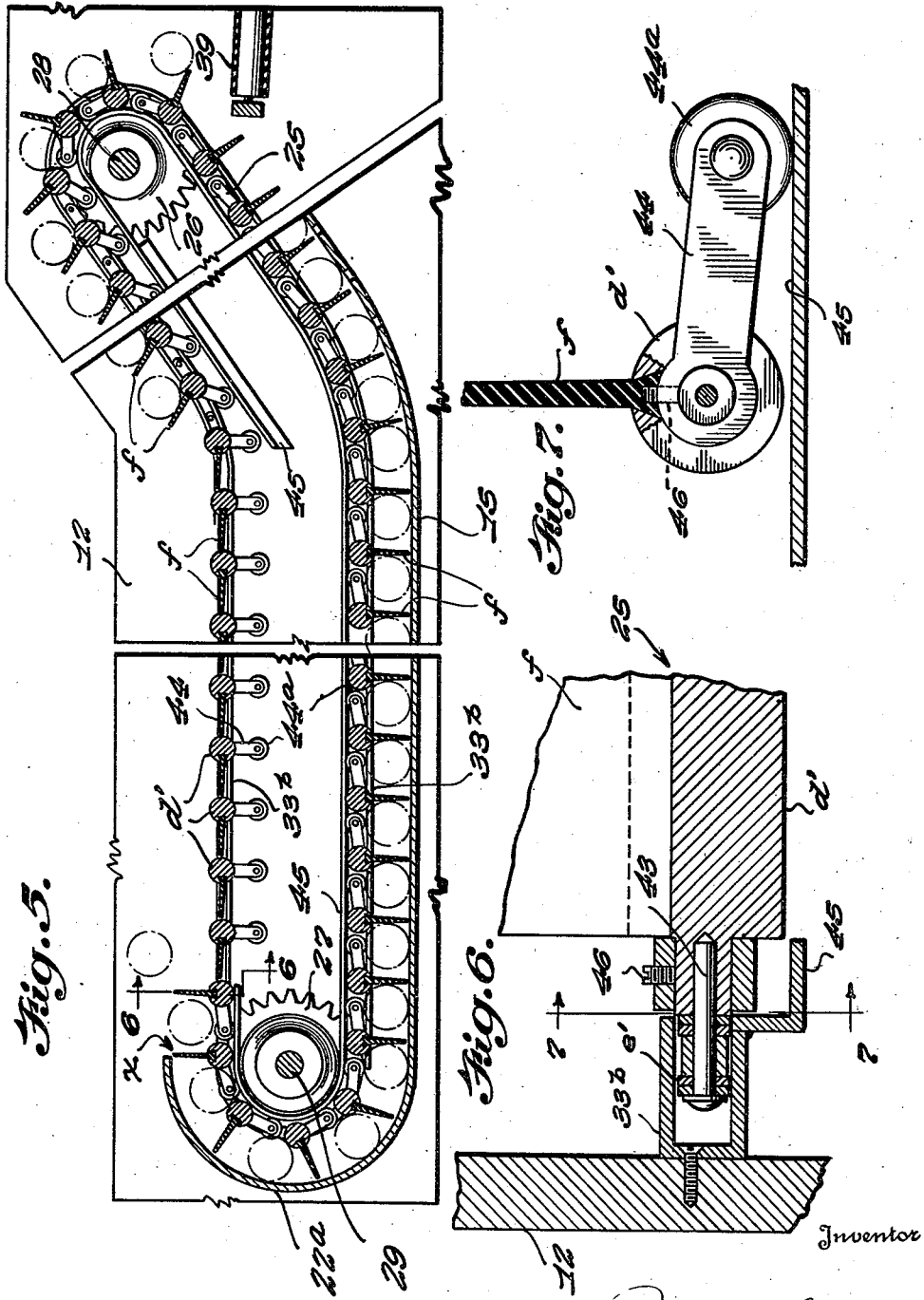

Patented May 19, 1942

2,283,512

UNITED STATES PATENT OFFICE 2,283,512

FLOTATION FRUIT SEPARATOR

Richard Sias, Orlando, Fla., assignor to American Machinery Corporation, Orlando, Fla.

Application April 4, 1941, Serial No. 386,925

9 Claims. (Cl. 209—173)

The present invention relates to improvements in fruit separators of the flotation type.

The separation of fruit, so as to segregate the good from the bad, is, of course, practiced in many ways but it sometimes becomes difficult to determine good and bad fruit from its exterior appearance, when such fruit has become frozen or frost-bitten as is particularly the case with citrus fruit. Freezing of such fruit disrupts the juice cells and causes the juice to evaporate through the pores of the skin of the fruit or, on one theory, is reabsorbed by the tree itself. Under such conditions air takes the place of the juice or fermentation occurs, causing gas to form in the fruit, and, in any event, the fruit becomes lighter in weight, according to the extent it has been frozen, which affects its marketability or desirableness. Thus, it can be determined, by floating the fruit, which of the fruit may be accepted as edible and which may be rejected as below the standards for market or human consumption.

One type of fruit flotation separator, which is typical and commonly used in the art, is shown in the U. S. patent to George D. Parker, No. 1,186,677, granted June 13, 1916. This type of separator employs a container having a flowing stream of liquid (such as water) into which the fruit is dropped at one end of the container and will arrange themselves, because of their difference in buoyance, at various levels or strata before the current of the water carries them beyond a dividing partition for separating the more desirable fruit, which raises more slowly because of its weight, from the less desirable fruit which, because of its relative lightness, raises quickly to higher levels in the water, the separated fruit being guided onto separate conveying surfaces where it is discharged from the machine.

However, it has been found that fruit having the same buoyancy will drop to different depths, due to its shape (flattened spheres, egg shape, lemon shape, lopsided and round) before the force of gravity is overcome by the impedence or pressure of the water and the buoyancy of the fruit; and therefore it frequently happens that a badly frozen fruit may drop as deep, or deeper, because of its shape, as a good fruit and will not raise quick enough to be separated from the good fruit before reaching the dividing partition, thus resulting in an inaccurate separation.

It is, therefore, the object of this invention to improve fruit separators of the flotation type in such manner as will deliver a plurality of fruit positively and continuously into the current stream at a predetermined depth and, then, release it so that the fruit will rise only under the influence of its own buoyancy or upward push of the water so that the more buoyant fruit—irrespective of its size or shape—will rise in the water from the same given level faster than the less buoyant and the relative speed between them is unaffected by the difference in shape or size.

A further object of the invention is to arrange the fluid container in such a manner as to obtain an even flow of water in the section of the tank into which the fruit is released so that there will be no eddies of the water or stratified layers or currents that will hinder proper and accurate separation of the fruit.

With the above and other objects in view as will appear as the specification proceeds, the invention resides in that which is shown, described or claimed.

In the accompanying drawings which show the preferred embodiments of the invention as at present devised, Figure 1 is a longitudinal sectional view of a separator constructed in accordance with the present invention;

Figure 2 is a fragmentary plan view of Figure 1;

Figure 3 is a fragmentary detail view of the conveyor construction;

Figure 4 is an enlarged fragmentary perspective view of one of the flights of the conveyor;

Figure 5 is an enlarged view of a modified construction of conveyor in the tank and which may be substituted for the tank conveyor shown in Figures 1, 2 and 3;

Figure 6 is an enlarged detail vertical sectional view taken substantially on line 6—6 of Figure 5; and Figure 7 is an enlarged detail view taken substantially on line 7—7 of Figure 6.

In the accompanying drawings like characters of reference denote similar and like parts throughout the several views.

The separator may, and preferably does, comprise an open top tank T for containing a liquid, such as water, and is of a general elongated formation substantially rectangular in cross section and in longitudinal section, having bottom wall 10, side walls 11 and 12 and end walls 13 and 14. Extending longitudinally of the tank is a horizontally arranged partition 15 disposed approximately two-thirds the distance from the normal water level in the tank and extending transversely from side to side, 11 and 12, of the tank to divide the tank into upper and lower compartments or passages 16 and 17, respectively, it being preferred to have the water depth in the tank between four and five feet. One end $a$ of the partition 15 terminates at a distance spaced from an end wall 13 of the tank, say—about two or three feet—while the other end portion $b$ of the partition extends upwardly on an inclined plane to the upper edge of the other end wall 14 of the tank. As can be seen particularly from Figure 1, it may be desired to terminate the upper edge of the wall 15 at, or approximately at, the normal water level of the tank, this inclined portion being perforated to provide for water circulation between the compartments or passages 16 and 17. The water is maintained in circulation from one compartment to the other, in the direction of the arrows in Figure 1, by one or more propellers 18 disposed in the passage 17 just forward of the inclined end portion $b$ of the partition 15 as illustrated, and each propeller is mounted on a shaft 19 extending longitudinally of the tank and supported in suitable bearings 20, the shaft being rotated from power means 21 connected with the outer end of the shaft extending through the wall 14 of the tank.

At the other end of the tank and adjacent the wall 13 thereof are provided a plurality of directing vanes 22. These vanes are a plurality of spaced arcuate plates arranged substantially concentric with respect to the end $a$ of the partition 15 and extending transversely from side to side of the tank so that their arcuate surfaces will direct flow of the water from the compartment 17 to the compartment 16, their lower ends being disposed in the space between the bottom wall 10 and the partition 15 and their upper ends between the partition 15 and the normal water level in the tank, as shown. These vanes prevent eddies or stratification in current, as well as swirling, as the water passes upwardly to the compartment 16 to flow in the direction of the arrows therein as shown in Figure 1.

The fruit to be treated is conveyed to the tank from a hopper or the like, not shown, by a conveyor 23 onto an inclined platform or chute 24, where it moves into contact with the underside of a second endless conveyor 25 which may be termed "a distributing conveyor." The conveyor 25 is trained over pulleys or sprocket wheels 26 and 27 mounted on shafts 28 and 29, respectively, journalled in suitable bearings on the side walls 11 and 12 of the tank. The shaft 28 is disposed adjacent the upper edge of the end wall 14 and above the chute 24 while the shaft 29 is disposed at the forward end $a$ of the partition 15 adjacent the end wall 13. As can be seen, particularly from Figure 1, the sprockets or pulleys 26 or 27 are so arranged that the lower run or reach of the conveyor 25 extends substantially parallel with the upper surface of the partition 15 and is spaced therefrom a distance sufficient to accommodate the normal run of sizes of fruit to be treated which will lie between the upper surface of the partition 15 and the lower reach of the conveyor.

The conveyor 25 may be of any suitable construction that will accomplish the purposes herein described; but, for purposes of illustration, it may consist of a plurality of bars $d$, preferably cylindrical, arranged side by side in substantially parallel relation and spaced from each other a distance sufficient to prevent the smallest size fruit, to be separated, from passing therebetween. The ends of these bars $d$ are connected by sprocket chains $e$ which pass over sprocket wheels 26 and 27. The shaft 28 of the pulley or sprocket 26 is also provided with a driving connection 30 with any suitable source of power, such as a motor 31, but this power may be taken from the motor 21 or conversely. Extending outwardly from each of the bars $d$, and at substantially right angles to the sprocket chains $e$, is a fin $f$ which, together with adjacent fins, form a plurality of transverse extending pockets on the conveying surface of the belt 25 to receive therein a row of fruit from the chute 24. These fins may be flexible or resilient (as one example—rubber or fabric stiffened by resilient finger $f'$) to a degree which may prevent crushing or injuring of the fruit as it moves from the chute 24 into said pockets. However, such flexibility is not a necessity when the feed conveyor 23 is in timed relation with the shaft 28 as by a gearing connection 32 (Figs. 1 and 2) to time it with a conveyor 25 for delivering one row of fruit to each of the pockets, thus avoiding jamming of the fruit as the fruit passes in contact with the conveyor. The end of the partition 15 adjacent the inner most vane 22 may be extended upwardly and around the end of the conveyor 25, as at 22$a$ in Figure 1, and terminated at a point so that the fruit being conveyed by the underside of the conveyor will pass upwardly around the pulley or sprocket 27 to the upper reach or side of the conveyor before being permitted to be discharged therefrom, at the point X, by its buoyancy. In order to provide for the bend in the conveyor 25 so that both of its reaches will run parallel to the body of the partition 15 as well as to its inclined end portion $b$, the guide rails 33 are suitably mounted on the side walls 11 and 12 of the tank to contact with the sprocket chain $e$ in a manner which will be clear to those skilled in the art. Also, the upper and lower reaches of the chain $e$ may be supported by guide rails 33$a$ secured to the sides of the tank.

Thus, it will be seen that the fruit, to be separated, passes from a delivery conveyor 23 to the underside of the distributing conveyor 25 where it is moved thereby in transverse rows along the upper side of the partition 15 and is guided around the pulley 27 by the vane guide member 22$a$ to the upper side of the conveyor at which point X the vane guide 22$a$ terminates; and, due to the buoyancy of each piece of fruit, it will rise from the pocket between the fins $f$ into the water stream and be moved simultaneously in the direction of the current flow, shown by the arrows, toward a horizontally disposed fruit separating partition 34.

This separating partition 34 is, preferably, made of foraminous material and disposed above the conveyor 25 about half way between the normal water level and the upper reach of the conveyor. This partition 34 extends across the interior of the tank from side to side thereof with its rear end positioned in close proximity to the upper inclined reach of the conveyor 25 and with its forward end terminating at about mid-way the length of the tank,—in other words, the partition 34 should have a length longitudinally of the tank of approximately four feet, more or less.

It will be observed particularly from Figure 2 that a vertical wall 35 divides the upper inclined reach of the conveyor 25 longitudinally into approximately equal sections A and B and extends from the upper end of the conveyor 25 forwardly and downwardly to the rear end portion of the separating partition 34. The fins $f$ on the conveyor 25 are slit or cut away intermediate their lengths as at 36 to provide an aligned slot through which the dividing wall 35 will extend so as to divide the separated fruit being raised on the conveyor from the tank to be discharged from the apparatus.

Disposed on opposite sides of the horizontal fruit separating partition 34 are fruit deflecting walls or guides 37 and 38, respectively. The upper deflector 37 extends rearwardly and angularly from a forward corner of the partition 34 to the forward edge of the dividing wall 35 and extends from the upper surface of the partition 34 to a point above the water level for guiding that portion of the floating fruit, whose buoyancy has caused it to rise sufficiently in the water stream to pass above the horizontal separating partition 34, rearwardly into contact with section A the conveyor 25 where it is raised and conveyed to a discharge conveyor 39 (Fig. 2). The other deflecting wall or guide 38 projects from the under side of the horizontal separating partition 34 to the upper reach of the conveyor 25 and extends rearwardly from the other forward corner of the partition 34 to the forward end of the conveyor dividing wall 35 so as to guide that portion of the fruit which passes below the separating partition 30, unto the other divided section B of the inclined portion of the conveyor 25 which raises the fruit from the tank and discharges it onto a discharge conveyor 40 (see Figure 2).

From the above construction, it will be seen that the fruit to be separated is carried from the delivery conveyor 23 positively by the conveyor 25 down into a current of liquid and is released at the bottom of the water current flow in compartment 16 so that each piece of fruit, regardless of shape or size, will rise in the liquid current with that impetus occasioned only by its own buoyancy and from a common point of discharge X. The resulting effect is that the badly damaged fruit, which is not acceptable or desirable for market purposes, will rise faster in the propelling stream of water than the good or less injured fruit—thus eliminating the condition explained in the fore-part of this specification where some badly injured fruit has a tendency to stay submerged deep into the water or raises so slowly as to pass under the separating partition 34 and out with the better grade of fruit. It is, of course, understood that the horizontal separating partition 34 is so located in the water stream as will divide the very light and undesirable fruit from the heavier and more desirable fruit, the lighter fruit passing above the partition 34 and the better and unfrozen fruit passing below the same, both types of fruit being discharged, respectively, from the tank by the divide section A and B of the upper inclined reach of the conveyor 25, where they are delivered, upon their discharge conveyor 39 and 40 as previously described.

In order that some adjustment may be made for varying the selection of the fruit to be separated, the forward end of the horizontal separating partition 34 is provided with a hinged extension 41, which may be raised and lowered, at will, into the compartment or passage 16 by adjustable means 42. The adjustable means may consist of a rod r connected with said extension 41 and threaded into a nut or block n fastened on a side wall of the tank.

In some instances it may be desirable to have the fins f collapsible or assume a horizontal position while the upper reach of the conveyor 25 is passing through the separating chamber or compartment 16 so as to offer no hinderance to the buoyance of the fruit to rise in the liquid stream and at or about the time the fruit is discharged therefrom. To this end there is shown in Figures 5 to 7, inclusive, one means whereby the above operation may take place. As shown in Figures 5 to 7 the bars d' are rotatably mounted at their ends on the sprocket chains e'. Attached to at least one end of each of the bars d' is weighted arm 44. The arms 44 are so positioned that when they are influenced by gravity to be moved to a depending position, as shown in Figure 5, their respective bars will be rotated to move their fins to a horizontal substantially aligned position. The position of the fins f are controlled by a guide rail 45 suitably carried on the side wall of the tank. This guide rail is co-extensive with one side edge of the conveyor 25 along its inner surface or perimeter except for that distance along the upper reach of the conveyor between the point x, where the fruit is discharged, and the upwardly inclined portion of the upper reach of the belt. At said last mentioned upper inclined portion of the conveyor the guide rail 45 is spaced further away from the conveyor so that when the weighted arms 44 contact with it the fins will be only partially raised, and not to a position substantially 90° with respect to the conveyor surface, to better facilitate the engagement of the fruit in the pockets formed between the fins of the adjacent bars d'. However, with respect to the lower reach of the conveyor 25 it is proposed to have the guide rail 45 positioned so as to move the arms 44 to bring fins to substantially 90° with respect to the conveying surface.

The distal ends of the arms 44 may be provided with contact rollers 44a. The arms may be adjustable about the axes of the bars d' by means of a set screw 46. In the form of the invention shown in Figures 5 and 6 the guide rail 33a, as shown in Figure 1, may be modified to provide a channel guide 33b which will receive the sprocket chains and be co-extensive with said chains, thus providing a definite and positive support for the conveyor throughout its entire length and eliminating the necessity for the guide shoes 33 shown in Figure 1. Of course, it will be understood that certain portions of the wall of the channel 33b will be cut away to provide for the entry of the sprockets 26 and 27. It is also obvious that the guide rail 45 for the arms 44 may be carried on the channel guide 33b as indicated in Figure 6 and may be attached thereto either by bolts or other fastening means such as by welding as indicated. Also as shown in Figure 6 the bars d' may be mounted at their ends upon a spindle 43 which forms one of the connecting pins for the links of the sprocket chain e', the spindle being a continuing projection of the sprocket chain pins.

Having thus described the invention and the manner in which the same is to be performed, it is to be understood that I am not to be limited to the exact construction herein described because the invention is susceptible to various modifications and changes which fall within the scope of the appended claims.

That which is claimed is:

1. A flotation fruit separator comprising a tank for liquid, means for causing said liquid to flow from one end of the tank to the other, an endless conveyor having one end portion of the reaches thereof submerged in said liquid in the tank for a determined distance below its level and extending in a direction in opposition to the flow of the liquid and the other end portion of its reaches rising from the tank to an inclination in the direction of liquid flow, means for delivering fruit to the lower reach portion of said upper unclaimed end of said conveyor, means for actuating said conveyor so that the lower reach moves toward the submerged end of the conveyor, whereby the fruit moved by the lower reach of the conveyor upwardly to the upper reach thereof will rise by its own buoyancy in the liquid in the tank, means for separating fruit floating in the liquid flow, means for deflecting each group of separated fruit to a segregated section on the upper reach of the conveyor, and discharge means associated with each section of said conveyor to receive the separated fruit therefrom.

2. In a flotation fruit separator as set forth in claim 1 wherein said endless conveyor is equipped with spaced substantially transversely extending flights normally held extending at substantially right angles with respect to said conveyor to form pockets on the conveyor surface, and means for causing each flight to move successively from normal position, when at a predetermined point in its travel with the upper reach of the conveyor, and to be moved back toward its normal position, when at another predetermined point in its travel.

3. In a flotation fruit separator as set forth in claim 1, wherein said endless conveyor is equipped with a plurality of pivoted and spaced flights, gravity influenced means attached to each of said flights for moving the latter to a collapsible position relative to the conveyor at a predetermined point in its travel with the conveyor, means for actuating said gravity influenced means to move and normally hold said flights at substantially right angles with respect to said conveyor surface at other points in the travel of said conveyor.

4. A flotation fruit separator comprising a tank for liquid, an endless conveyor having substantially parallel disposed reaches submerged into the liquid in the tank and having at least one end portion rising from the tank at an inclination while the other end is submerged, means for causing said liquid to flow in the tank toward the inclined portion of the conveyor, means for delivering fruit to the lower reach of said conveyor, means for actuating said conveyor so that the lower reach moves toward the submerged end of the conveyor, whereby the fruit moved by the lower reach of the conveyor upwardly to the upper reach thereof will rise by its own buoyancy in the liquid in the tank, means for separating the fruit floating in said liquid current, means for deflecting each group of separated fruit to a segregated section on the upper reach of the conveyor, and discharge means at the upper inclined end of the conveyor to receive the separated fruit from said conveyor.

5. A flotation fruit separator comprising a tank for liquid having a horizontal dividing partition therein dividing the tank into upper and lower chambers communicating at their ends, one end portion of said partition being spaced from one end wall of the tank and the other end portion being upwardly inclined to the other end wall of the tank, an endless conveyor having the reaches thereof co-extensive with said partition and substantially parallel therewith, said conveyor having flights thereon to receive fruit therebetween, means at the upper end of the inclined portion of the partition for delivering fruit to the lower reach of said conveyor, means for actuating said conveyor so that its lower reach moves away from the feeding means toward the other end of the dividing partition whereby fruit being moved by the lower reach of the conveyor will rise by its own buoyancy in the liquid in the tank when carried upwardly to the upper reach thereof, means for circulating said liquid in the direction of movement of the conveyor, means for separating the fruit floating in the liquid current in said upper chamber, means dividing the inclined portion of the upper reach of the conveyor into sections, means for deflecting each group of separated fruit to one of said sections of the conveyor, and discharge means associated with each section of said conveyor to receive the separated fruit therefrom.

6. A flotation fruit separator comprising a tank for liquid having a horizontal dividing partition therein dividing the tank into two chambers communicating at their ends, one end portion of said partition being spaced from one end wall of the tank and the other end portion being upwardly inclined to the other end wall of the tank, an endless conveyor having the reaches thereof co-extensive with said partition and substantially parallel therewith, the lower reach of said conveyor facing the upper surface of said partition, means for delivering fruit to the lower reach of said conveyor, means for actuating said conveyor so that its lower reach moves from its inclined end portion to its other end portion, means for causing said liquid to circulate in the direction of movement of the conveyor, means at said other end of said conveyor for guiding the fruit on the lower reach thereof upwardly around said end of the conveyor where the fruit is released to rise by its own buoyancy in the liquid in the tank, means for separating the floating fruit in the liquid current, means dividing the inclined portion of the upper reach of the conveyor into sections, means for deflecting each group of separated fruit to one of said sections on the conveyor, and discharge means associated with each section of said conveyor to receive the separated fruit therefrom.

7. A flotation fruit separator comprising a tank for liquid having a horizontal dividing partition therein spaced from one end wall thereof, the other end portion of said partition being upwardly inclined to the other end wall of the tank and being perforated, thereby dividing the tank into upper and lower chambers communicating at their ends to permit the passage of liquid therethrough; liquid propelling means disposed in the tank between the bottom thereof and slightly forward of the inclined perforated portion of said partition for causing said liquid to flow through the lower chamber, around the spaced end of the partition, through the lower chamber and the perforated end of the partition; an endless conveyor having its lower reach coextensive with said partition and substantially parallel therewith, means at the upper end of the inclined portion of the partition for delivering fruit to the lower reach of said conveyor, means for actuating said conveyor so that its lower reach moves away from the feeding means toward the other end of the dividing partition whereby fruit being moved by the lower reach of the conveyor will rise by its own buoyancy in the liquid in the tank when carried upwardly to the upper reach thereof, means for separating the fruit floating in the liquid flow in said upper chamber, means for deflecting each group of separated fruit to a segregated conveyor area on the upper reach of the conveyor, and discharge means associated with each section of said conveyor to receive the separated fruit therefrom.

8. A flotation fruit separator comprising a tank for liquid having a horizontal dividing partition therein dividing the tank into chambers communicating at their ends, and fluid propelling means disposed in the tank for causing said liquid to circulate from one chamber to the other, an endless conveyor having the reaches thereof substantially parallel with and the lower reach facing said partition, said conveyor having one end portion upwardly inclined and rising beyond the normal liquid level in the tank, means at the upper end of the inclined portion of the conveyor for delivering fruit to the lower reach of said conveyor in timed relation with the movement of said conveyor, means for actuating said conveyor so that its lower reach moves downwardly into the tank, means at the other end of said conveyor for guiding the fruit moved by its lower reach upwardly around said end and releasing the fruit to rise by its own buoyancy in the liquid in the tank, a horizontal fruit separating partition between the upper reach of the conveyor and the normal liquid level in the tank and extending from the inclined portion of the upper reach of the conveyor toward but remote from said point of release of the fruit by buoyancy from said conveyor, means dividing the inclined portion of the upper reach of the conveyor into two sections, deflecting means at the upper and lower sides of said fruit separating partition for directing the fruit on each side of said fruit separating partition to one of said sections of the conveyor, and discharge means associated with each section of said conveyor to receive the separated fruit therefrom.

9. A flotation fruit separator comprising a tank for liquid having a horizontal partition therein, one end portion of said partition being upwardly inclined to a wall of the tank and above the liquid level, means for causing said liquid to flow toward said inclined end of the partition, an endless conveyor having the reaches thereof substantially parallel with said partition, the lower reach of said conveyor facing the upper surface of said partition, means on the conveyor forming transversely extending pockets to receive fruit thereinto, means at the upper end of the inclined portion of the conveyor for delivering fruit to the pockets of the lower reach of said conveyor in timed relation with the movement of said conveyor, means for actuating said conveyor so that its lower reach moves from the inclined end portion of the conveyor toward the other end thereof, a curved plate extension at said other end of said conveyor for guiding the fruit being moved by its lower reach upwardly around said end and then terminating to allow the fruit to rise from the conveyor by its own buoyancy in the liquid in the tank, means for separating the floating fruit in the liquid current, means dividing the inclined portion of the upper reach of the conveyor into sections, and means for deflecting each group of separated fruit to one of said sections on the conveyor, and discharge means associated with each section of said conveyor to receive the separated fruit therefrom.

RICHARD SIAS.

CERTIFICATE OF CORRECTION.

Patent No. 2,283,512. May 19, 1942.

RICHARD SIAS.

It is hereby certified that error appears in the printed specification of the above numbered patent requiring correction as follows: Page 4, first column, line 7-8, claim 1, for "unclaimed" read --inclined--; and that the said Letters Patent should be read with this correction therein that the same may conform to the record of the case in the Patent Office.

Signed and sealed this 30th day of June, A. D. 1942.

Henry Van Arsdale,
Acting Commissioner of Patents.

(Seal)